United States Patent
Rau et al.

(10) Patent No.: US 8,622,202 B2
(45) Date of Patent: Jan. 7, 2014

(54) APPARATUS AND METHOD FOR SELECTIVELY ACTUATING MOVING CONVEYOR ROLLERS

(75) Inventors: Brien G. Rau, Jefferson, LA (US); Jason M. Lagneaux, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 332 days.

(21) Appl. No.: 12/996,556

(22) PCT Filed: Jun. 18, 2009

(86) PCT No.: PCT/US2009/047814
§ 371 (c)(1),
(2), (4) Date: Dec. 6, 2010

(87) PCT Pub. No.: WO2010/008756
PCT Pub. Date: Jan. 21, 2010

(65) Prior Publication Data
US 2011/0073442 A1 Mar. 31, 2011

Related U.S. Application Data

(60) Provisional application No. 61/074,745, filed on Jun. 23, 2008.

(51) Int. Cl.
*B65G 17/24* (2006.01)
(52) U.S. Cl.
CPC ............ *B65G 17/24* (2013.01); *B65G 2201/02* (2013.01)
USPC .......................................... 198/779; 198/780

(58) Field of Classification Search
USPC ........ 198/370.03, 370.06, 779, 780–792, 845
See application file for complete search history.

(56) References Cited

U.S. PATENT DOCUMENTS

| | | | | |
|---|---|---|---|---|
| 1,735,767 A | * | 11/1929 | Keller et al. | 198/791 |
| 4,781,281 A | * | 11/1988 | Canziani | 198/370.06 |
| 4,884,676 A | * | 12/1989 | Suizu | 198/370.06 |
| 5,588,520 A | * | 12/1996 | Affaticati et al. | 198/370.06 |
| 5,701,992 A | * | 12/1997 | Enomoto | 198/370.06 |
| 5,861,694 A | * | 1/1999 | Niemela | 310/89 |
| 6,244,427 B1 | * | 6/2001 | Syverson | 198/788 |
| 6,253,901 B1 | * | 7/2001 | Hintz et al. | 198/370.06 |
| 6,253,910 B1 | * | 7/2001 | Axmann | 198/835 |
| 6,820,561 B2 | * | 11/2004 | Soldavini et al. | 104/88.04 |
| 7,080,725 B2 | * | 7/2006 | Hishinuma | 198/370.06 |
| 7,284,653 B2 | * | 10/2007 | Fourney et al. | 198/370.03 |
| 7,533,766 B1 | * | 5/2009 | Fourney | 198/370.09 |
| 7,556,136 B2 | | 7/2009 | Marshall et al. | |
| 8,033,379 B2 | * | 10/2011 | Syndikus | 198/370.06 |
| 2003/0221935 A1 | * | 12/2003 | Barklin et al. | 198/357 |
| 2004/0173441 A1 | * | 9/2004 | Wieting et al. | 198/850 |
| 2010/0230245 A1 | | 9/2010 | Ragan et al. | |

* cited by examiner

*Primary Examiner* — William R Harp
(74) *Attorney, Agent, or Firm* — James T. Cronvich

(57) ABSTRACT

A conveyor having selectively actuated rollers whose only external contact is with conveyed articles and a method for rotating such rollers. In one version, the rollers are driven by motors that are selectively energized by a wireless signal or a sensed conveyor position. In another version, the rollers are geared to a drive wheel that engages a bearing surface underlying the conveyor along the conveying path. The rollers are selectively actuated to push conveyed articles along the conveyor as it advances.

22 Claims, 8 Drawing Sheets

APPARATUS AND METHOD FOR SELECTIVELY ACTUATING MOVING CONVEYOR ROLLERS

BACKGROUND

The invention relates generally to power-driven conveyors and, more particularly, to conveyors, such as belt conveyors, with selectively actuated advancing rollers.

Conveyor belts with rollers provide material-handling functions such as product diversion, sortation, singulation, separation, orientation, and acceleration. The belts typically include an array of rollers arranged in rows and columns. The rollers extend through the thickness of the belt to support products on one side and to engage bearing surfaces underlying the belt on the other side along a carryway. As the belt advances, the rollers rotate as they roll on the bearing surfaces and propel supported products in the direction of the rollers' rotation. The orientation of the rollers' axes of rotation determines the direction in which products are propelled atop the belt. The bearing surfaces may be formed by a continuous pan across the entire width of the belt or by parallel, linear flat bearing surfaces arranged under each column of rollers. In some applications, the peripheries of actuating rollers serve as bearing surfaces on which the belt rollers roll as the belt advances. These bearing surfaces may all be arranged to move into and out of contact with the belt rollers to selectively actuate the rollers. The bearing surfaces may be moved by pneumatic cylinders or other mechanical devices. Because, in some cases, the bearing surfaces are heavy, moving them rapidly into and out of contact with the belt rollers may require a complex framework and a lot of power. Furthermore, even though the belt rollers roll on the bearing surfaces, the contact is not frictionless and, so, increases the tension in the belt and reduces roller life.

Thus, there is a need to reduce the shortcomings associated with rollers that roll on bearing surfaces and support products.

SUMMARY

These shortcomings are overcome by a conveyor embodying features of the invention. One version of such a conveyor comprises a plurality of rotatably mounted rollers disposed on the conveyor in positions to support conveyed articles. The rollers advance with the conveyor in a conveying direction. At least one motor advancing with the rollers rotates the rollers.

Another version comprises a conveyor belt having a main body with an article-carrying side and an opposite drive side. Rollers are rotatably mounted on the belt. Salient peripheral portions of the rollers are outside one side of the main body. A drive mechanism couples to a plurality of the rollers. Motive means on the belt and coupled to the drive train drives the drive train to rotate the rollers.

Another aspect of the invention provides a method for rotating an article-supporting roller in a conveyor. The method comprises: (a) advancing a plurality of article-supporting rollers along a carryway in a conveying direction; and (b) selectively energizing a motor disposed in the conveyor to advance with the rollers and coupled to at least one of the article-supporting rollers to rotate the rollers.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
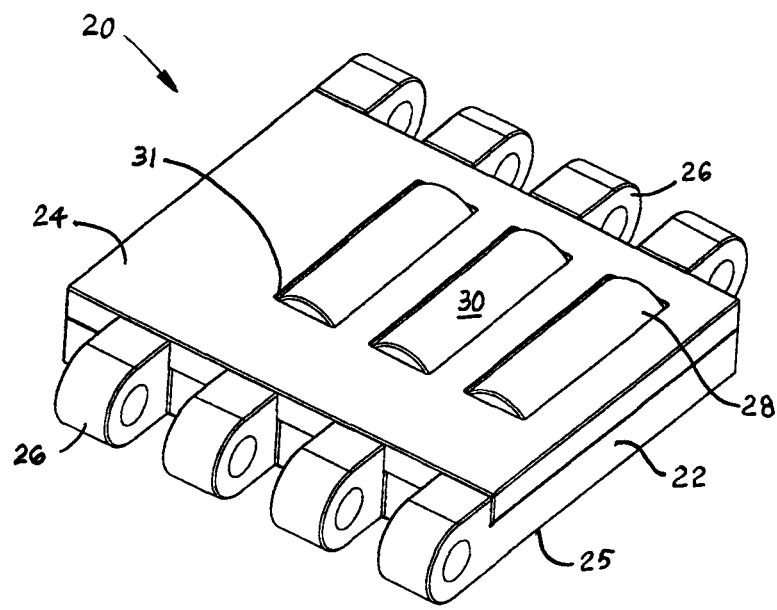
FIG. 1 is a top isometric view of one version of a belt module embodying features of the invention.

A conveyor belt module embodying features of the invention is shown in FIG. 1. The module 20 has a main body 22 with a top article-carrying side 24 and a bottom drive side 25. Hinge elements, in the form of hinge eyes 26, extend outward from leading and trailing ends of the main body. Salient peripheral portions 28 of rollers 30 extend above the top article-carrying surface of the module from cavities 31 to support conveyed articles.

Figure 2:
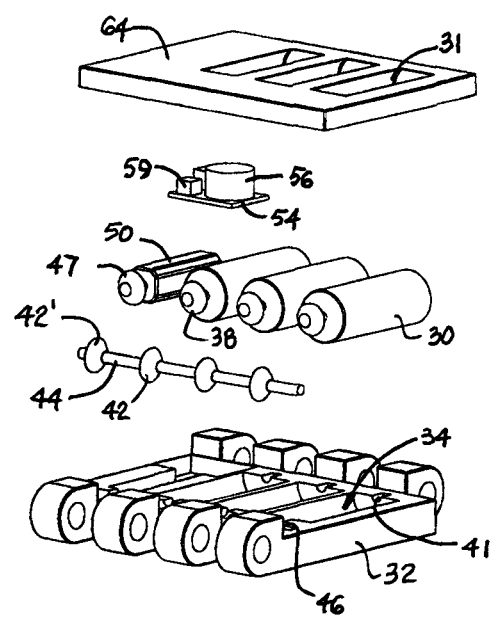
FIG. 2 is an exploded view of one version of a roller drive system for use in a belt module as in FIG. 1.
Figure 3:
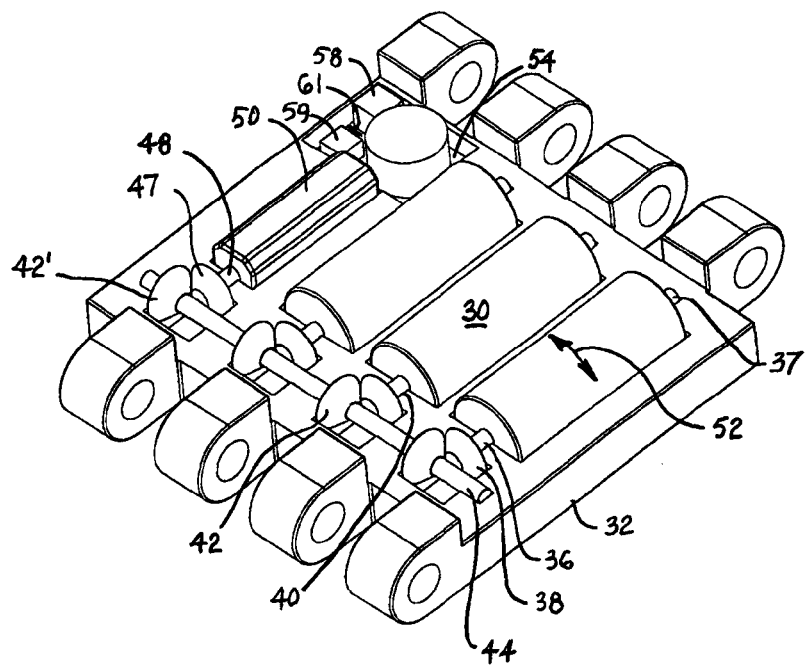
FIG. 3 is an isometric view of a belt module having the drive system of FIG. 2 with the top cover removed.

As shown in FIGS. 2 and 3, the hinge eyes extend from a base portion 32 of the main body 22 of the module 20. Depressions 34 formed in the base portion receive the rollers 30. The outside diameter of the rollers is less than the diameter of the depressions to allow the roller to rotate in the module without frictional contact. An axle or a stub 36 extending from one end of each roller terminates in a bevel gear 38. The other end of the axle or a coaxial stub 37 extends outward of the other end of the roller. The stubs are supported in small-diameter recesses 40, 41 formed in the base portion of the module at both ends of the depressions. The bevel gears on the roller axles engage bevel gears 42 mounted on a drive shaft 44 arranged transverse to the roller axles and seated in a recess 46 in the base portion. One of the drive-shaft bevel gears 42' engages a bevel gear 47 mounted at the end of a shaft 48 on a motor 50, such as a dc motor. When the motor is energized, its shaft 48 rotates, which rotates the transverse drive shaft 44, which rotates the roller axles and, thus, the rollers themselves in the direction of arrow 52. The direction of roller rotation can be changed by reversing the polarity of the motor current. The shafts, axles, and gears form a drive mechanism for rotating the rollers.

Like the rollers, gears, shafts, and motor, an electronics module 54 is housed in the belt module. The electronics module may include, for example, a power supply 56 including a power source or energy storage device, such as a battery or a capacitor, which supplies power to the motor and the electronic components in the electronics module. Other electronic components may include an intelligent controller 58, such as a microcontroller with associated memory, a proximity switch 59, a radio receiver 61, and associated auxiliary circuitry. All the components are retained in the base portion of the module by a cover 64 that forms, together with the base portion, the main body of the module. The top cover and the base portion are preferably made of a thermoplastic polymer, such as polypropylene, polyethylene, acetal, or composite materials, in an injection-molding process.

Figure 4:
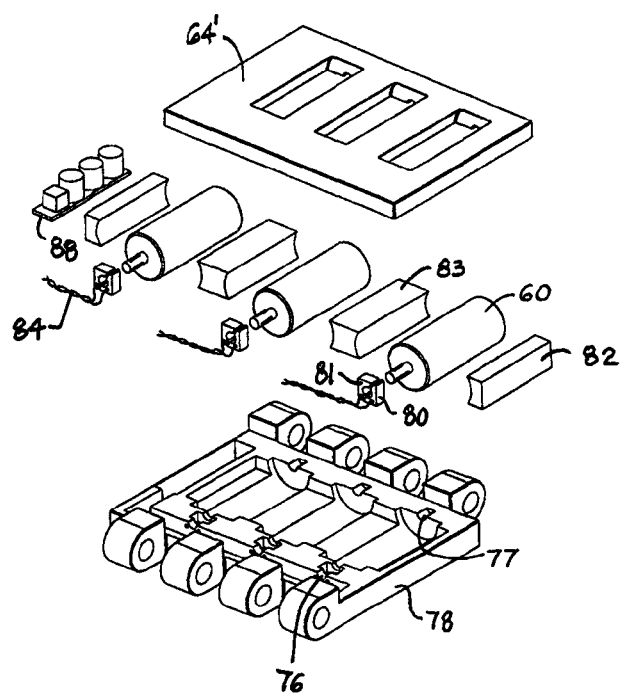
FIG. 4 is an exploded view of another version of a roller drive system for use in a belt module as in FIG. 1, in which each roller houses a motor armature.
Figure 5:
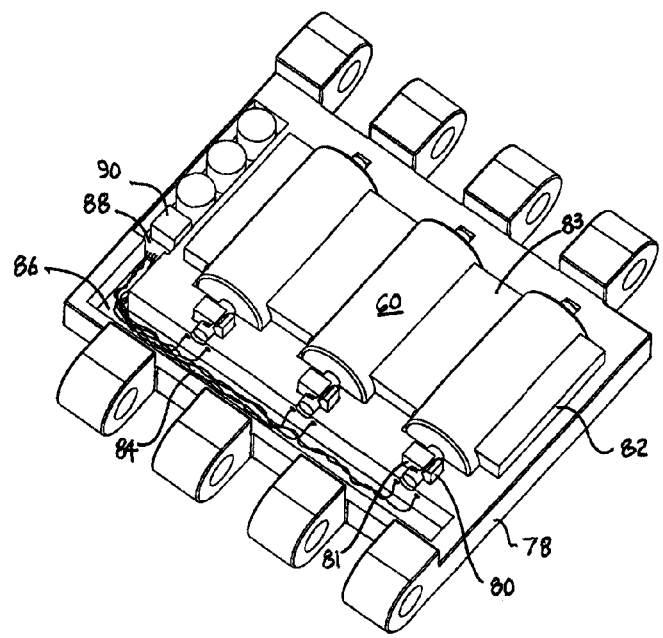
FIG. 5 is an isometric view of a belt module having the drive system of FIG. 4 with the top cover removed.
Figure 6:
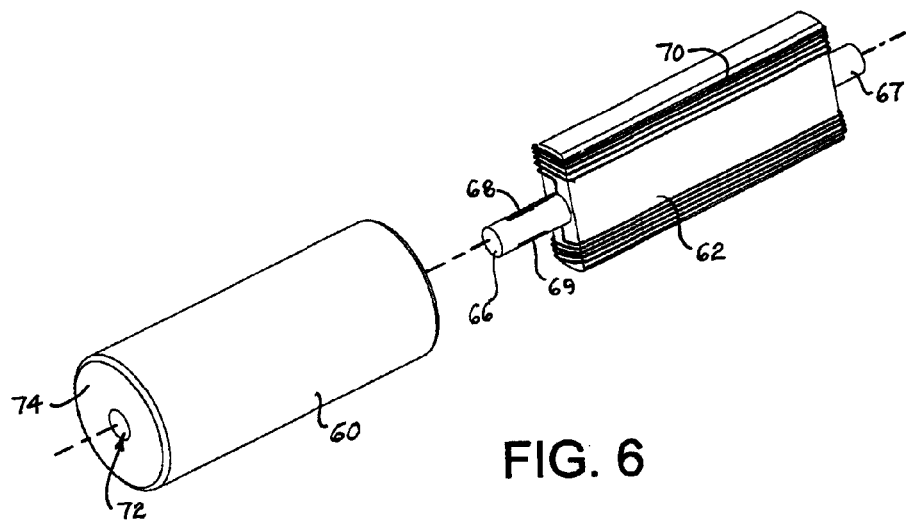
FIG. 6 is an exploded view of a motorized roller usable in the belt module of FIG. 4.

The belt module of FIG. 1 could also be constructed differently, as shown in FIGS. 4-6. In this example, the rollers 60 are hollow to make room for a motor armature 62, such as the two-pole armature shown in FIG. 6. Axle stub 66, 67 extend from the ends of the armature. One of the stubs has a pair of commutator segments 68, 69 electrically connected to the ends of a rotor winding 70. The armature is affixed to the interior of the roller by a press-fit or by a retainer so that the roller rotates with the armature. The axle stubs extend through openings 72 in roller end plates 74 and are rotatably seated in seats 76, 77 formed in a base portion 78 of the module. Current to the armature winding flows through a pair of brushes 80, 81 contacting the commutator segments with alternate polarity as the rotor rotates. Permanent magnets 82, 83 flank the rollers to form, with the armatures, complete motors. Wires 84 connected to each brush are routed through a trough 86 to an electronics module 88. The electronics module includes a controller 90 that controls the supply of current to each motor. The electronics module also includes a power supply and other supporting electronics and may include a wireless radio receiver for receiving signals from a transmitter off the belt or a position sensor, such as a proximity switch, for sensing a position along a conveying path. The controller can respond to a signal or to an indication from a position sensor to energize or de-energize the roller motors. The rollers and other components are retained within the belt module by a top cover 64'.

Figure 7:
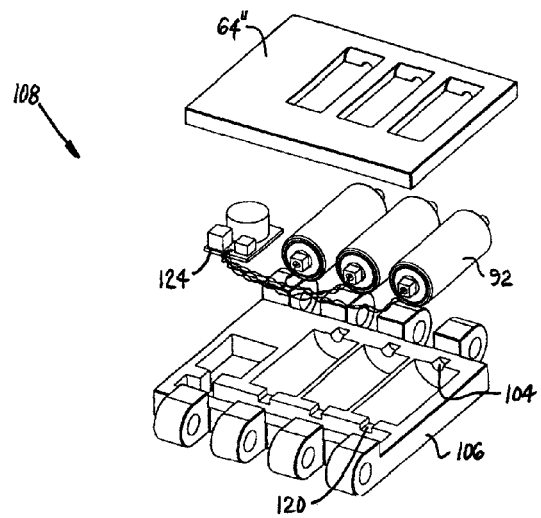
FIG. 7 is an exploded view of another version of a roller drive system, in which each roller houses a motor.
Figure 8:
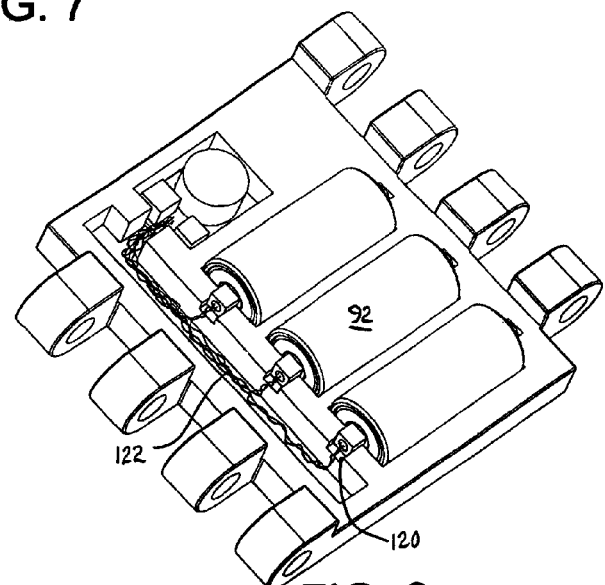
FIG. 8 is an isometric view of the belt module of FIG. 7 with the top cover removed.
Figure 9:
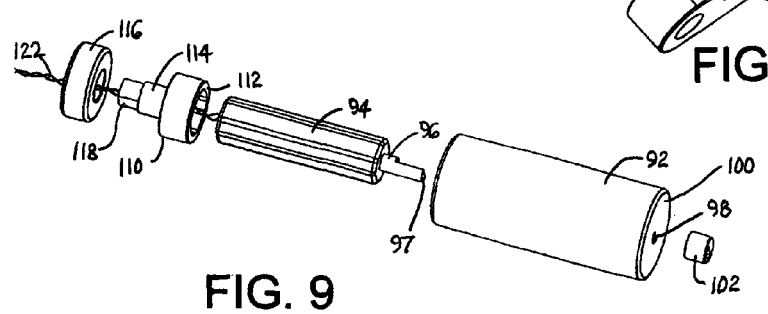
FIG. 9 is an exploded view of the roller of FIG. 8.

A slightly different motorized roller arrangement is shown in FIGS. 7-9. In this version, each roller 92 houses a complete motor 94. The motor has a shaft 96 with a D-shaped end 97 that extends through a D-shaped opening 98 in an end plate 100 of the roller and into a D-shaft bearing 102. The bearing is rotatably received in a notch 104 formed in a base portion 106 of a belt module 108. A motor torque seat 110 has a ring portion 112 that retains an end of the motor shell and keeps it from rotating. A reduced diameter portion 114 of the torque seat serves as a race for an idle bearing 116 that seals the end of the roller and supports the torque seat and the end of the motor. A bulkhead 118 at an end of the torque seat extends outside the roller and is registered in a slot 120 formed in the base portion of the module. The registration prevents the motor from rotating relative to the module. When the motor is energized, its shaft rotates the roller through its connection at the end plate 100. The idle bearing rotates with the rollers on the stationary torque seat. The bulkhead also admits wires 122 into the roller to energize the motor. The wires are routed to an electronics module 124, which is similar to that described with respect to FIGS. 4-6. All the components are retained in place by a top cover 64", whose underside, like those of cover 64 and 64', is contoured with recesses and features to mate with the base portion and accommodate the rollers and associated electronics.

Figure 10:
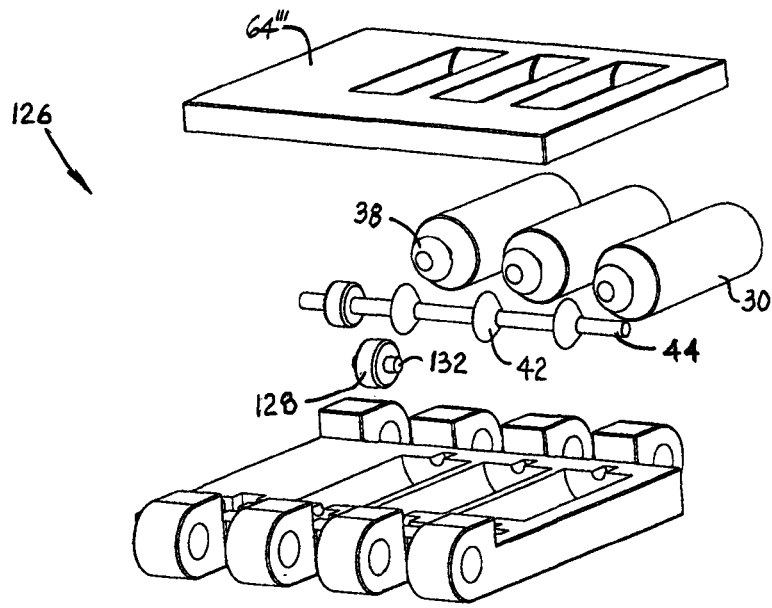
FIG. 10 is an exploded view of yet another version of a roller drive system and a belt module embodying features of the invention.
Figure 11:
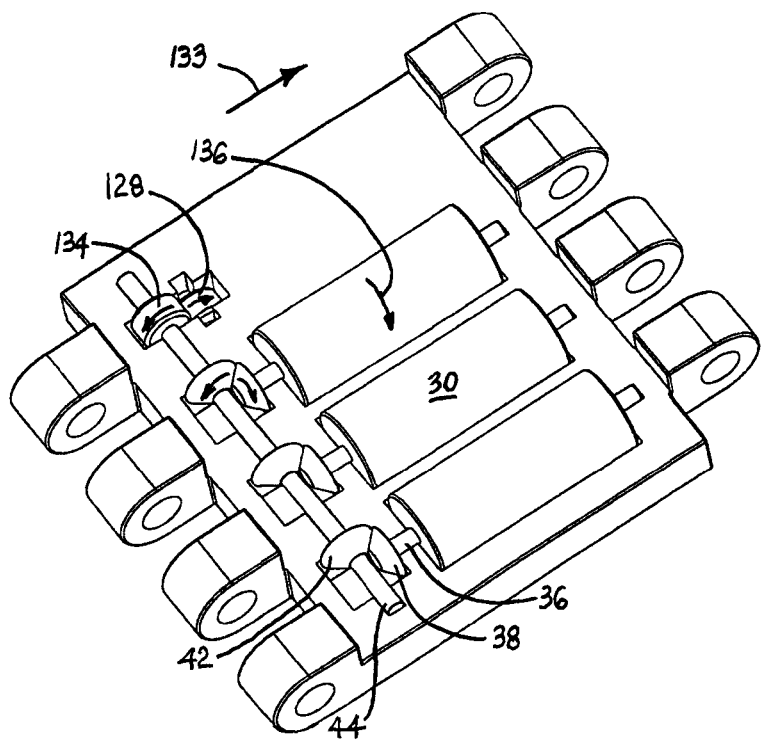
FIG. 11 is an isometric view of the belt module of FIG. 10 with the top cover removed.
Figure 12:
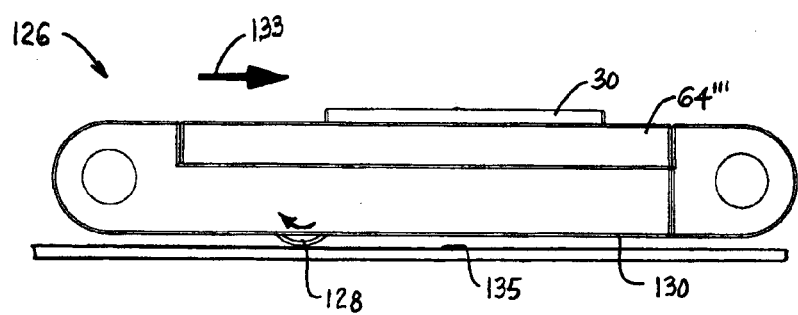
FIG. 12 is a side elevation view of the belt module of FIG. 10 in a conveyor system.

A non-motorized roller-belt module 126 is shown in FIGS. 10-12. In this version, the rollers 30 are driven by a drive shaft 44 as in the drive mechanism of FIGS. 2 and 3. Bevel gears 42 on the drive shaft engage bevel gears 38 on the roller axles 36. Instead of using a motor as motive means, the drive shaft is driven by a drive wheel 128 that extends below the bottom 130 of the module. Axle stubs 132 on the drive wheel allow it to rotate in the module. The periphery of the drive wheel frictionally engages the periphery of a wheel 134 mounted on the drive shaft. The peripheries of one or both wheels are formed by a high-friction material, such as rubber or an elastomer, for better frictional engagement with each other. Alternatively, gear or cog wheels could be used instead of the roller wheels. If gear wheels are used, the drive wheel would preferably have a smooth, high-friction outer periphery as the drive wheel 128, but with a coaxial gear recessed inward of the drive wheel's periphery to engage the external teeth of a gear mounted on the drive shaft. As shown in FIG. 12, as the module advances to the right in a conveying direction 133, the drive wheel 128 rotates clockwise in FIG. 12 as it rolls on a bearing surface 135 underlying the module along a conveyor carryway. As shown in FIG. 11, this causes the rollers to rotate in the direction of arrow 136. The bearing surface may be raised and lowered or otherwise moved out of contact with the wheel to selectively activate the rollers. A top cover 64''' retains the components in the module.

Figure 13:
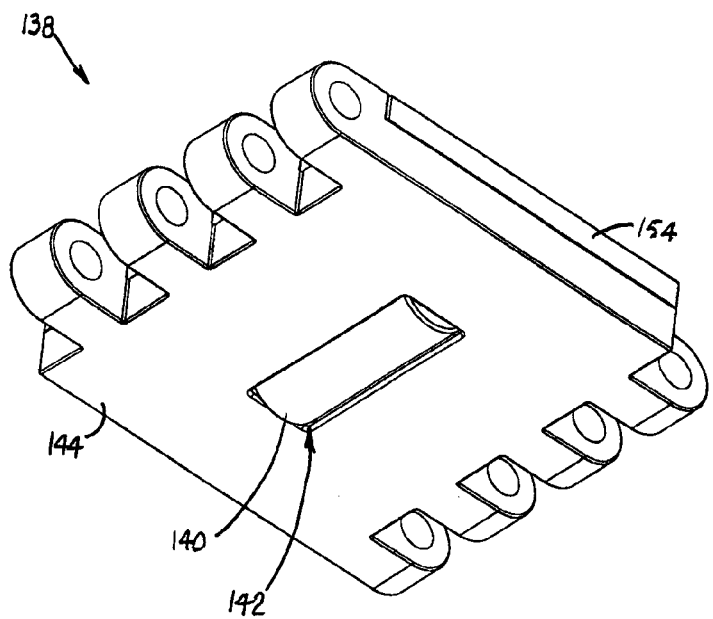
FIG. 13 is a bottom isometric view of another version of belt module embodying features of the invention including a belt-drive roller embedded in the module.
Figure 14:
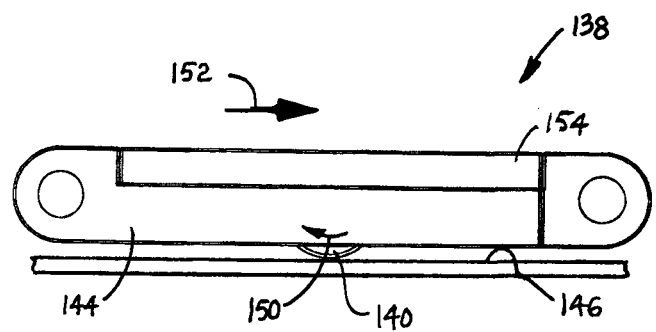
FIG. 14 is a side elevation view of the belt module of FIG. 13 in a conveyor system.
Figure 15:
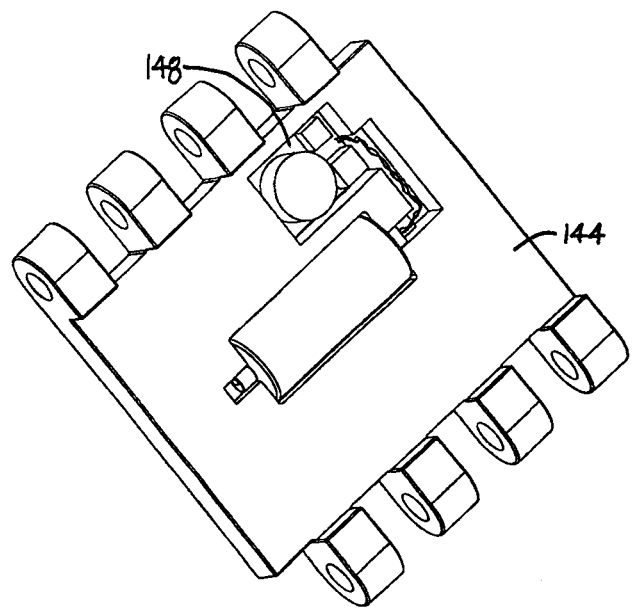
FIG. 15 is a bottom isometric view of the belt module of FIG. 13 with the bottom cover removed.

A motorized roller may also be used to drive a conveyor belt constructed of belt modules 138 as in FIGS. 13-15 along a carryway. In this version, a roller 140, rotatable on an axis perpendicular to the direction of belt travel, protrudes through an opening 142 in the bottom base portion 144 of the module. The roller shown in this example has an embedded motor like the motor 94 in FIGS. 7-9. The periphery of the roller 140 is preferably made of a high-friction material for better traction on an underlying support surface 146. The motor embedded in the roller is selectively energized from an electronics module 148 housed in the belt module. When the roller is driven in the direction of arrow 150, it drives the belt in the direction of arrow 152. Thus, the motorized rollers may be used to drive or aid in the driving of a conveyor belt constructed of these modules. A cover 154 retains the components in place.

Figure 16:
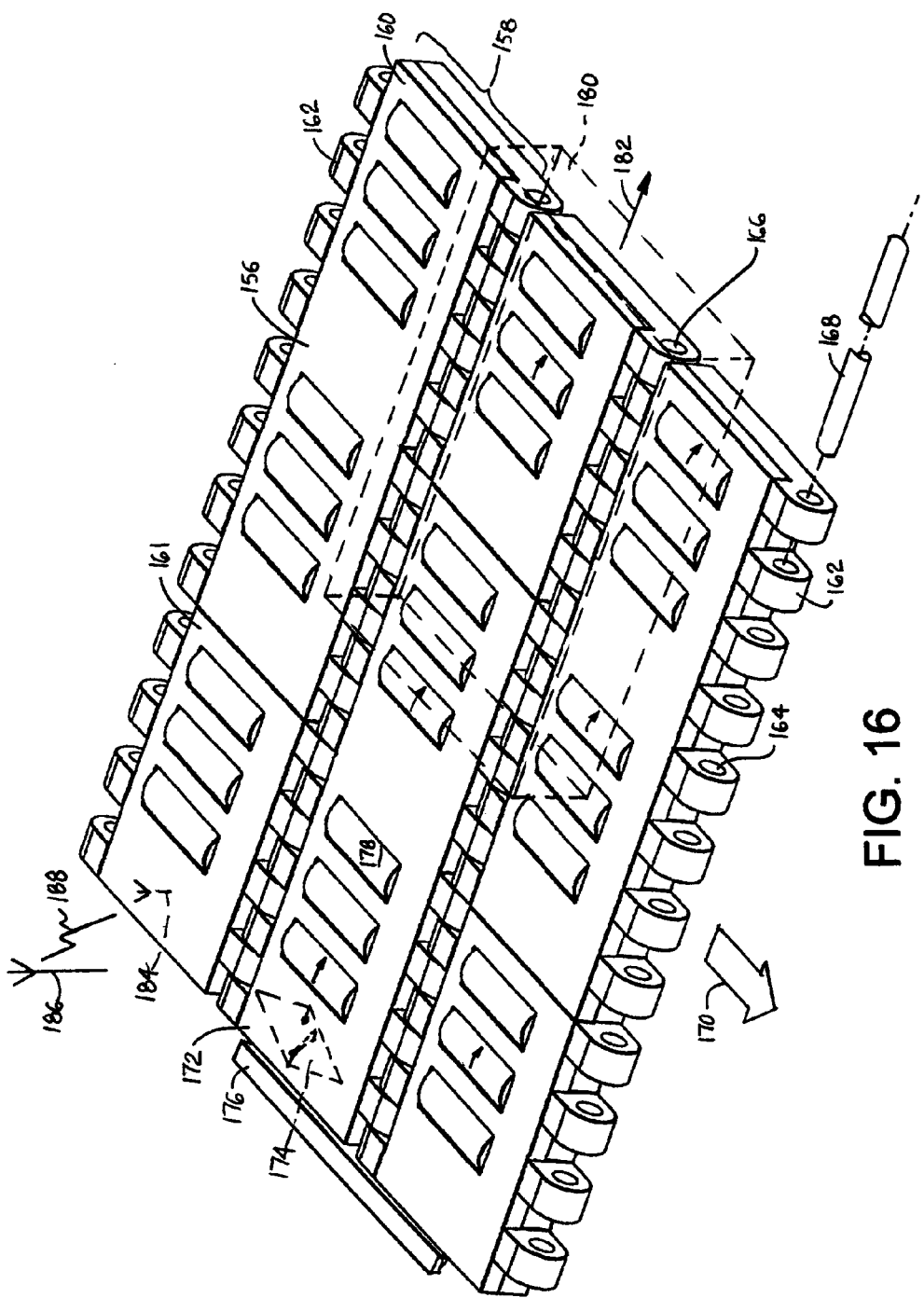
FIG. 16 is an isometric view of a portion of a conveyor system having a conveyor belt constructed of modules as in FIG. 1.

FIG. 16 shows a portion of the carryway of a conveyor system using a belt constructed of belt modules having motorized rollers as a conveying medium. The belt 156 is constructed of a series of rows 158 of belt modules, including long modules 160 and short modules 161, in a bricklay pattern. In this way, the belt can be made as wide as necessary by using more or fewer modules in each row. The belt could alternatively be made of a single module per row, in which case each module extends the entire width of the belt. Hinge elements, such as hinge eyes 162, at the ends of each row of modules are interleaved with the hinge eyes of an adjacent row. Apertures 164 in each of the interleaved hinge eyes are aligned to form a continuous passageway 166 across the width of the belt. Hinge rods 168 inserted in the passageway link the rows together at hinge joints to form an endless conveyor belt. The belt is driven in a conveying direction 170 by drive sprockets or drive drums (not shown) engaging drive surfaces in the underside of the belt along the belt's path. In this example, the belt modules making up each row have motorized rollers, such as those previously described.

In one version, a module 172 houses an electronics module that includes a proximity switch 174. When the module encounters a magnetic strip 176 defining a specific length of the carryway path, the proximity switch closes and causes power to be supplied to the associated motors driving the article-conveying rollers 178. The energized motors rotate the rollers to which they are coupled and push conveyed articles 180 toward or off a side of the belt as indicated by arrow 182. When the proximity switch passes the downstream end of the magnetic strip, the switch opens to de-energize the roller-rotating motors.

In another version, an electronics module embedded in a belt module has a radio receiver and antenna 184. A radio transmitter 186 mounted external to the belt transmits a signal 188 to the receiver commanding a controller in the module to energize the motors to rotate the belt rollers. The same transmitter or another downstream transmitter can transmit another signal commanding the controller to de-energize the motor. Each receiver could have a unique address or operate in a unique frequency band, or channel, to allow the rollers in each module to be independently controlled over the wireless network described.

Although the invention has been described in detail with respect to a few preferred versions, other versions are possible. For example, the article-contacting belt rollers are shown with axes parallel to the conveying direction. But the rollers could be arranged on axes perpendicular or oblique to the conveying direction. The wireless radio link and the proximity switch and magnetic strip are examples of just some means for selectively energizing the roller motors. Other kinds of sensors, such as optical sensors and infrared sensors, may be used to selectively energize the motors at specific positions along the conveying path. As another example, the conveying medium is described in detail as a modular plastic conveyor belt. But the conveyor could be realized as a flat belt conveyor, a slat conveyor having slats suspended between parallel roller chains, or any other medium in which the rollers advance along the conveying path. As yet another example, the drive mechanism, which is shown with bevel gears mounted on a drive shaft, could alternatively use a timing belt, timing gears, worm gears, or O-rings and pulleys to transmit power to the belt rollers. So, as these few examples suggest, the scope of the claims is not meant to be limited to the preferred versions used as examples to describe the invention.

What is claimed is:

1. A conveyor comprising:
   a conveyor belt having an outer surface and an opposite inner drive surface and cavities opening onto the outer surface;
   a plurality of rotatably mounted rollers disposed in the conveyor belt between the outer surface and the inner surface in positions to support conveyed articles and advancing with the conveyor in a conveying direction;
   at least one motor disposed in the conveyor belt between the outer surface and the inner drive surface and advancing with the rollers and rotating the rollers;
   wherein the cavities receive the rollers with a salient portion of the rollers protruding from the cavity past the outer surface of the belt;
   wherein the conveyor belt includes a series of rows of one or more belt modules hingedly linked together to form the conveyor belt.

2. A conveyor as in claim 1 wherein each motor drives a plurality of rollers.

3. A conveyor as in claim 2 wherein at least some of the modules have a single motor driving a plurality of the rollers.

4. A conveyor as in claim 1 further comprising means for selectively energizing the motor, wherein the means for selectively energizing the motor is disposed in the conveyor belt between the outer surface and the inner drive surface and advances with the conveyor belt and is coupled to the motor.

5. A conveyor as in claim 4 wherein the means for selectively energizing the motor comprises a proximity switch.

6. A conveyor as in claim 4 wherein the means for selectively energizing the motor comprises a controller capable of controlling power to the motor and a wireless receiver coupled to the controller and receiving a wireless signal commanding the controller to energize the motor.

7. A conveyor as in claim 1 further comprising a drive mechanism disposed in the conveyor belt between the outer surface and the inner drive surface and including gears coupling the at least one motor to the plurality of rollers.

8. A conveyor as in claim 7 wherein the drive mechanism includes a drive shaft with a plurality of bevel gears.

9. A conveyor as in claim 8 wherein each motor includes a shaft terminating in a bevel gear engaging one of the bevel gears on the drive shaft and each roller includes a shaft terminating in a bevel gear engaging other of the bevel gears on the drive shaft.

10. A conveyor as in claim 1 further comprising a power supply disposed in the conveyor belt between the outer surface and the inner drive surface and advancing with the conveyor belt to supply power to at least one of the motors.

11. A conveyor as in claim 1 wherein the at least one motor comprises a plurality of motors, each motor having an armature housed in one of the rollers.

12. A conveyor as in claim 11 further comprising permanent magnets disposed in the conveyor belt between the outer surface and the inner drive surface and flanking the rollers.

13. A conveyor as in claim 1 wherein at least some of the belt modules have a base portion with depressions to receive the rollers and the at least one motor and a cover portion mating with the base portion to retain the rollers and the at least one motor in place.

14. A conveyor belt comprising:
    a main body having an article-carrying side and an opposite drive side, wherein the main body is formed by a series of rows of one or more belt modules hingedly linked together;
    a plurality of rollers rotatably mounted in the main body between the two sides with salient peripheral portions outside one side of the main body;
    a drive mechanism disposed in the main body between the two sides and coupled to a plurality of the rollers;
    motive means disposed in the main body between the two sides and coupled to the drive mechanism for driving the drive mechanism to rotate the rollers.

15. A conveyor belt as in claim 14 wherein the motive means comprises a wheel coupled with the drive mechanism and extending at least partly from the main body of the belt in a position to roll on a bearing surface as the conveyor belt advances.

16. A conveyor belt as in claim 14 wherein the motive means comprises a motor coupled to the drive mechanism.

17. A conveyor belt as in claim 14 wherein the salient peripheral portions of the plurality of rollers are on the drive side of the belt in position to drive the belt by rolling on a bearing surface underlying the belt.

18. A conveyor belt as in claim 14 wherein the drive mechanism includes a drive shaft with a plurality of bevel gears engaging the rollers.

19. A method for rotating an article-supporting roller in a conveyor belt, the method comprising:
    advancing a plurality of article-supporting rollers disposed between an outer side and an opposite inner side of a conveyor belt formed by a series of rows of one or more belt modules hingedly linked together along a carryway in a conveying direction;

selectively energizing a motor disposed in the conveyor belt between the outer and inner sides to advance with the rollers and coupled to at least one of the article-supporting rollers to rotate the rollers.

20. The method of claim 19 further comprising transmitting a signal to a receiver disposed in the conveyor belt between the outer and inner sides with the rollers to energize the motor.

21. The method of claim 20 further comprising transmitting a signal to the receiver to de-energize the motor rotating the rollers.

22. The method of claim 19 further comprising sensing a position along the carryway and energizing the motor to rotate the rollers when the position is sensed.

* * * * *